US006840195B1

(12) United States Patent
Ashley

(10) Patent No.: US 6,840,195 B1
(45) Date of Patent: Jan. 11, 2005

(54) AVIAN MEDICAMENT OR PEST CONTROL PRODUCT AND METHOD

(75) Inventor: Roger D. Ashley, 363 Highway 32, Fair Play, MO (US) 65649

(73) Assignee: Roger D. Ashley, Fair Play, MO (US)

( * ) Notice: Subject to any disclaimer, the term of this patent is extended or adjusted under 35 U.S.C. 154(b) by 0 days.

(21) Appl. No.: 10/407,873

(22) Filed: Apr. 4, 2003

Related U.S. Application Data

(60) Provisional application No. 60/370,638, filed on Apr. 6, 2002.

(51) Int. Cl.[7] .......................... A01K 13/00; A01K 35/00
(52) U.S. Cl. ....................... 119/655; 119/713; 119/814; 119/651
(58) Field of Search ................................ 119/651, 655, 119/713, 814; 40/300–302, 662–664

(56) References Cited

U.S. PATENT DOCUMENTS

| 1,657,865 A | | 1/1928 | Merle, Sr. ..................... 40/664 |
| 1,737,201 A | | 11/1929 | Reimer ......................... 40/664 |
| 3,103,666 A | | 9/1963 | Bone ............................ 40/664 |
| 3,552,051 A | | 1/1971 | Ritchey ........................ 40/664 |
| 3,675,357 A | | 7/1972 | Magee .......................... 40/300 |
| 3,686,717 A | | 8/1972 | Merser ......................... 24/298 |
| 3,765,110 A | * | 10/1973 | Olsen ........................... 40/663 |
| 3,765,113 A | | 10/1973 | Megee .......................... 40/300 |
| 3,850,297 A | | 11/1974 | Merser ......................... 206/343 |
| 4,059,074 A | * | 11/1977 | Furer et al. ................... 119/655 |
| RE29,536 E | | 2/1978 | Fearing |
| 4,263,730 A | | 4/1981 | Clements ...................... 40/663 |
| 4,579,085 A | * | 4/1986 | McGuire ....................... 119/655 |
| 4,633,606 A | | 1/1987 | Cohr |
| 4,694,781 A | * | 9/1987 | Howe et al. ................. 119/655 |
| 4,697,549 A | * | 10/1987 | Hair ............................ 119/651 |
| 4,739,565 A | | 4/1988 | Reggers |
| 4,790,090 A | * | 12/1988 | Sharber ........................ 40/300 |
| 5,074,252 A | * | 12/1991 | Morgan, Jr. ................. 119/654 |
| 5,321,872 A | | 6/1994 | Merser ....................... 24/704.1 |
| 5,373,656 A | | 12/1994 | Merser ......................... 40/663 |
| 5,983,540 A | | 11/1999 | Ashley ......................... 40/300 |

FOREIGN PATENT DOCUMENTS

| DE | 535028 | 10/1931 | .................. 40/301 |
| GB | 1053454 | 1/1967 | .................. 40/301 |
| GB | 1320454 | 6/1973 | .................. 40/301 |
| GB | 1372769 | 11/1974 | .................. 40/301 |

\* cited by examiner

*Primary Examiner*—Son T. Nguyen
(74) *Attorney, Agent, or Firm*—Jonathan A. Bay

(57) ABSTRACT

An avian medicament or pest control product is a combination of a medicament or pest control release agent, as well as at least two impregnable devices that have been specially impregnated the medicament or pest control release agent, and then also at least one fastener for piercing through some chosen anatomy of the avian specimen and retaining one impregnable device aside an entry wound and another impregnable device aside the exit wound. The fastener and impregnable devices are scaled sufficiently small to minimize stress or other ill effects on the health or productivity of the specimen, whose natural movements over time are consequently anticipated upon to disperse the release agent across his or her body through the oil and wax of his or her feathers.

4 Claims, 2 Drawing Sheets

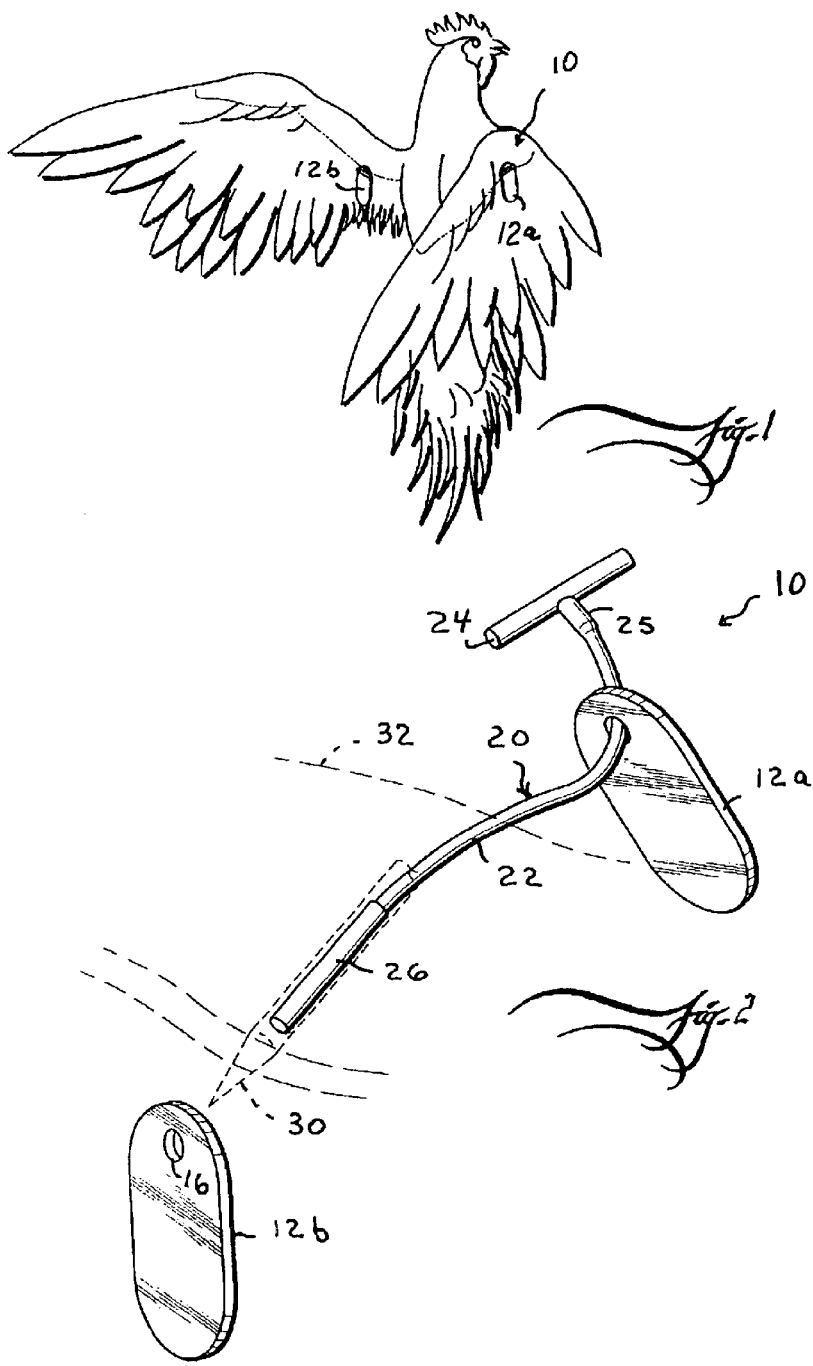

AVIAN MEDICAMENT OR PEST CONTROL PRODUCT AND METHOD

CROSS-REFERENCE TO PROVISIONAL APPLICATION(S)

This application claims the benefit of U.S. Provisional Application No. 60/370,638, filed Apr. 6, 2002, which provisional application is incorporated herein in full by this reference.

BACKGROUND OF THE INVENTION

The invention relates to livestock pest control products and methods, and more particularly to an avian medicament and/or pest control product and method. A number of additional features and objects will be apparent in connection with the following discussion of preferred embodiments and examples.

In this country as elsewhere there are considerable industries in the "farming" of certain avian species. For example the poultry industry includes without limitation the production of chickens and turkeys among other birds, but the production of chicken and turkey livestock can be truly large scale. Perhaps 450 million turkeys are produced annually in the U.S., or something like 1½ turkeys annually per person. On a greater scale still, the annual U.S. production of chickens is billions and billions. Naturally enough there is a commercial niche for servicing the medicament and pest control needs of these birds.

For example, a common widespread pest that bedevils the poultry industry is a rather minute parasite, the northern fowl mite (*Ornithonyssus sylviarum*). The northern fowl mite is indeed a major pest. It is a blood-feeder and, because of its bites and blood-feeding effects, infestations cause much irritation as well as blood-loss to the point of varying degrees of anemia. Notwithstanding the problems experienced by the birds, the northern fowl mite is also a pest to humans too: namely the poultry workers. Most notably this is seen in table-egg laying operations.

By way of background, poultry operations can be roughly classified into three categories. Broiler operations throughput the most birds of all and large-scale broiler operations rear thousands or so hatchlings at a time within close confines of pens or barns to a harvest age of about forty-two days. Large-scale table-egg laying operations can be characterized by hundreds or thousands of compact cages stacked and arrayed in huge blocks wherein each cage provides tightly cramped quarters for one to several hens for their fourteen month or so use life. Breeding operations (excluding artificial insemination operations) can be characterized by pens or barns of thousands of birds like broiler operations, except that a rooster to hen ratio of one for each ten or twelve is aimed for and that the livestock is retained for about fourteen months or so as in the case of table-egg laying operations.

To get back to table-egg laying operations, again the egg-laying hens are confined in compact cages arrayed in huge stacks or blocks of hundreds or thousands. A representative multi-occupant cage might measure three feet square by a foot tall (1 m²×30 cm). Alternatively, a reduced-size multi-occupant cage might measure about two feet by one-and-one-half feet rectangular (60 cm×45 cm) by ten inches (25 cm) or so tall. Such cramped quarters serve as multiple-occupancy units for say five or six hens at a time. As the hens do their work, the eggs roll or slide down gutters or chutes to conveyors. The conveyors transfer the eggs into egg-handling barns (or more simply, buildings) staffed by workers who might manually do any number of things including without limitation packing washed eggs into retail egg cartons. If the egg-laying hens are suffering an infestation of northern fowl mites, the fowl mites swarm over the hens including around her egg-laying vent. As a hen produces an egg a certain number of mites hitchhike a ride. Regardless how the mites actually get on the egg, the mites hitchhike their way into the egg-handling barn and once there, readily jump off onto everything along the way including the workers. Needless to say the mites bite and irritate the workers as savagely as they do the hens.

The losses to the egg-laying operation are multiple. Infested hens generally perform below levels they could meet if healthier and so egg-producing capacity falls below optimum. Also, the workers are now involved and their complaints require the operations management to provide a fix. However, the options over what to do are not without costs, losses and other problems. The conventional ways to control northern fowl mites is with control agents which are referred to variously as insecticides, acaricides, or miticides. Treatment methods conventionally include having workers spray the birds or dip the birds, or alternatively providing dust bins of the stuff and letting the birds do the job themselves. Problems relate to the fact that these agents are quite often noxious and contaminants. These agents pose moderate health problems to the birds if inhaled over long periods of time or ingested by being mixed in with the feed or water. These agents also pose moderate health problems to workers by exposure through either inhalation or skin contact. Many of the chemical compounds found in various popular control agents are also environmental contaminants. Hence workers and/or environmental protection authorities indeed want or in actual fact have varying say over the scope of use of some of the control measures. More significantly, in table-egg laying operations, since egg shells are moderately porous then the avoidance of contaminating table eggs is paramount.

Given that background, the popular treatment methods of the prior art can now be quickly re-examined, this time for their relative shortcomings. Dust bins are not truly a workable option for cages. The birds are simply too confined. Whatever dust they ruffle up that doesn't stick in their feathers is free to drift about and suffer consequences on whatever it lands and thus is really an escaped contaminant. That is, the drift might land in the birds' feed, their water, perhaps on their eggs, or otherwise float around in clouds to be inhaled by the birds and workers alike or else simply float away and find itself in the surrounding litter or other substrates on which the birds are being raised. This contaminated material is subsequently spread on crop-land or grass pasture, and hence the contaminants can find their way into the ground water or surrounding watercourses. Spraying is a comparable "broad" application technique that is comparably plagued by escaping clouds of dust. Yet with spraying and even more so with dipping, these techniques require greater manpower to carry out.

What is needed is a reliable and economical medicament and/or pest control product and method for overcoming the problems of the prior art and in order to improve overall health, safety and productivity in connection with the poultry industry including improving working conditions for workers as well as safety for the environment and consumers.

SUMMARY OF THE INVENTION

It is an object of the invention to provide a product for as well as a "method of delivery" of medicaments and/or pest-control agents for birds by means of small plastic devices, preferably tags, that are impregnated with the respective medicament or pest-control agent and thus are attached to individual birds.

It is an alternate object of the invention to attach such devices to the wing web.

It is an additional object of the invention to attach such devices by means of PIN-ON® style filament fasteners or the like.

It is another object of the invention to control northern fowl mite infestations by the foregoing means wherein the chosen control agent(s) is(are) selected from among various categories of insecticides, acaricides, miticides and so on.

These and other aspects and objects are provided according to the invention in an impregnated plastic device affording a user the opportunity to attach one or more of it to a given bird by means of one or more PIN-ON® style filament fasteners or the like. Neither the filament fastener(s) nor the hanging tag(s) cause anything more than minimal stress or other ill effects on the health or productivity of the bird. Utilization of medicament and/or pest control tags applied directly to the bird eliminates much spraying, dusting or dipping, and thereby obviates many of the health, safety and environmental contamination issues and concerns associated with spraying, dusting or dipping. More particularly, managing northern fowl mite issues through the use of such tags not only provides the poultry industry with an economical alternative to sprays or dusts or even dipping, but also avoids unnecessary introduction of contaminants to the environment of poultry production facilities.

More particular aspects and objects of the avian medicament or pest control product in accordance with the invention comprises the following. There is in combination a medicament or pest control release agent, there is also an impregnable device that indeed is impregnated with said medicament or pest control release agent for thereafter exuding or flowing out slowly over time, and then there is preferably a filament-style, double cross-bar ended fastener. The fastener is used for fastening the impregnable device to an avian specimen by piercing through some chosen anatomy of that specimen. The bird's natural movements over time are consequently anticipated upon to disperse the release agent across his or her body through the oil and wax of his or her feathers.

Optionally two such impregnable devices are utilized in the manner discussed more particularly below. The impregnable devices is produced from a plastic or resinous material that has suitable porosity or other property(ies) allowing impregnation or incorporation with the release agent such that, as said, the release agent releases, exudes or flows out slowly over time. Optionally the impregnable device is produced from polyvinyl chloride. The medicament or pest control release agent comprises any of insecticides, acaricides, or miticides.

If using two impregnable devices, preferably the fastener pierces through the chosen anatomy of the specimen such that it retains one impregnable device aside an entry wound and the other impregnable device aside the exit wound. The fastener and impregnable devices are scaled sufficiently small to minimize stress or other ill effects on the health or productivity of the specimen.

In one preferred embodiment of the invention, the fasteners comprise filament-style, double restrictor-ended fasteners and the impregnable devices comprise flat tokens formed with apertures sized to closely fit around the central filament of the fastener but otherwise obstruct the restrictor ends from pulling through.

The invention also pertains to an inventive method of avian treatment or pest control. General usage aside, embellishments on how to carry out the inventive method include the following. Preferably the chosen anatomy is chosen for locating at least one impregnable device in path of anticipated self-grooming movements. This could be through the wing web in order to locate the impregnable device in what corresponds to the specimen's armpit.

Alternatively the chosen anatomy might be chosen for locating at least the other impregnable device to rub against other specimens as well. Examples include situations when individuals crowd tightly together and jostle around as during activities as feeding or drinking from common feeding or watering provisions. Nevertheless, the chosen anatomy might still be through the wing web in order to locate the impregnable device on the outer wing, or that is on what might be imaginatively conceived as the specimen's shoulder.

Rather than have every bird carry impregnable devices, rearing situations can be created, adjusted or taken advantage of so that only some birds carry while the rest are non-carriers. That is, given a group of avian specimens for collective medicament or pest control treatments, the method has workers selecting some (ie., at least one) but not all as carrier specimen(s), the remainder being reckoned as non-carrier specimens. Then, interaction between said carrier and non-carrier specimens are promoted such that rubbing contact therebetween transfers release agent onto the non-carrier specimens. That is, one option for promoting interactions between carrier and non-carrier specimens is by taking advantage of how table-egg laying hens are reared, as by high-density confinement in compact cages. There might be six birds in a cage. Only one bird need carry the impregnable devices. The non-carriers will get what they need through rubbing contact.

Another option for promoting interactions between carrier and non-carrier specimens includes taking advantage of high-density rearing of flocks in pens or barns. There likely are established provisions around which the flock will much crowd and jostle as around common feeding or watering provisions.

An additional option for promoting interactions between carrier and non-carrier specimens is available in breeding operations. That is, breeding operations typically have a flock which essentially consists of breeding males and breeding females. One of every ten or dozen birds will be a male. That way, interactions between carrier and non-carrier specimens can be "promoted" (eg., more accurately, capitalized on) by virtue of choosing the males only for the duty of carrying the impregnable devices. The natural breeding attention the male give to the females will take care of the rest of things.

As previously mentioned, the preferred chosen anatomy is through the wing web for locating one impregnable device in what corresponds to the specimen's armpit and hence in path of anticipated self-grooming movements as well as for locating the other impregnable device on the outer wing, or that is on what might be imaginatively conceived as the specimen's shoulder.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of an avian livestock specimen provided with avian medicament or pest control products in accordance with the invention and according to a preferred manner and place of affixation;

FIG. 2 is an enlarged scale perspective view of one embodiment of avian medicament or pest control product(s) in accordance with the invention, wherein the leading (ie., the lower near one in the view) cross-bar end of a PIN-ON® style filament fastener is shown flexed back on the central shaft thereof for accomplishing affixation by a piercing tip (shown in part in dashed lines) of an applicator tool (not otherwise shown), as piercing through some chosen anatomy of the given avian specimen, preferably the wing web (also shown in part in dashed lines);

DETAILED DESCRIPTION OF THE PREFERRED EMBODIMENTS

Figure 3:
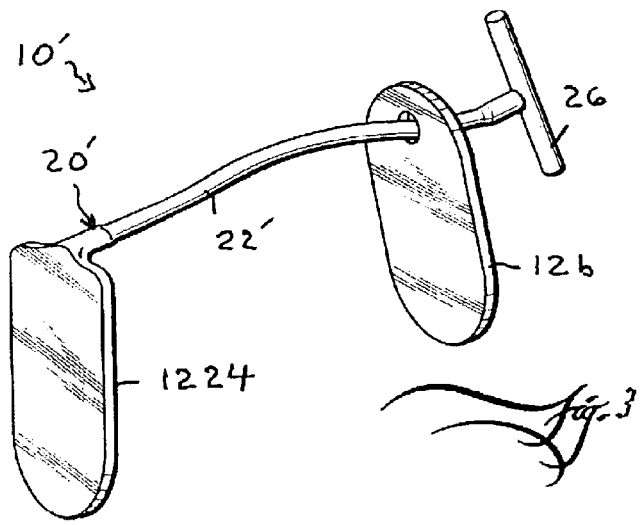
FIG. 3 is a perspective view comparable to FIG. 2 except showing an alternate embodiment of avian medicament or pest control product(s) in accordance with the invention.

FIG. 1 shows a given avian specimen that is provided with avian medicament or pest control products 10 in accordance with the invention. In this view, the particular specimen comprises a rooster for illustrative, non-limiting purposes only and for convenience of this description as the product is comparably effective with chicken and turkey hens, turkey toms as well as likely any other avian species and surely regardless of gender. Commercial poultry operations are predominantly but not exclusively represented by chicken and turkey operations and comprise one intended use market for the invention. Nevertheless it is reasonably expected that the inventive product 10 and method is comparably effective on other avian species and hence the applicability of the inventive product 10 and method applies to them in comparable measure.

FIG. 2 shows a first version of the avian medicament or pest control product(s) 10 in accordance with the invention. Aspects of the inventive product 10 hereof are disclosed by the commonly-invented, commonly-owned U.S. Pat. No. 5,983,540, entitled "Method and Tagging System for Marking and Identifying Birds." With renewed reference to FIG. 2, it shows a pair of opposite plastic devices or tags 12a and 12b that get fastened on opposite sides of some chosen anatomy of a given avian specimen. Preferably fastening is achieved by means of one or more PIN-ON® style filament fasteners 20. These kinds of fasteners are known in the art. PIN-ON® style filament fasteners are readily recognized by the retail public in use in affixing garment tags to garments in retail stores. An early patent covering such PIN-ON® style filament fasteners includes U.S. Pat. No. 3,765,110, owned through assignment by Monarch Marking Systems, Inc., Dayton, Ohio, who also owns the series of PIN-ON® U.S. trademark and/or service mark registrations.

In FIG. 2, the single filament fastener 20 shown thereby is a one-piece unit produced from resilient plastic material and having an elongated axial or central filament 22 terminating in a pair of cross-bar or "restrictor" ends 24 and 26. The central axial filament or shaft 22 may be optionally formed with a shoulder portion 25 near where it terminates in a trailing cross-bar end 24 of the filament fastener 20. The purpose for this optional shoulder 25, if present (and its presence is not particularly relevant in the current invention) is to limit the flexion between the trailing cross-bar end 24 and the central axial shaft 22. In contrast, the central axial shaft 22 lacks such a shoulder at the leading cross-bar end 26, which as a result permits freer flexion between the leading cross-bar end 26 and the central axial shaft 22. The absence of such flexion-limiting means is useful for accomplishing affixation of the filament fastener 20 to its target as described more particularly below.

In this description, the terms "leading" and "trailing" are descriptive of the preferred direction of attack with the filament fastener 20 when threading or piercing its target(s). However, often either end 24 or 26 can be used interchangeably as the leading or trailing end and accordingly the phraseology like "leading" or "trailing" ends or tags are used merely for convenience in this description and do not limit the invention in particular.

That aside, FIG. 2 shows the leading cross-bar end 26 flexed in full back upon the central axial shaft 22 as it would be in the instance of affixing the filament fastener 20 to its target(s). During the affixation process, there exist known applicator tools (or "guns," none shown) some of which have pistol-grips and are manually actuated by squeezing "triggers." Details of the tool aside, there conventionally is a piercing tip 30 which is shown in part in dashed lines in FIG. 2. The leading cross-bar end 26 is flexed as shown to insert inside the piercing tip 30. This allows a user to do the following activities:—namely, thread on the trailing tag 12a, pierce the chosen anatomy 32 of the given avian specimen, thread on the leading tag 12b and then actuate (if having an actuator) the applicator tool (not shown). As a result, the piercing tip 30 can be withdrawn (or perhaps pulled through), thereby releasing the flexion on the leading cross-bar end 26 such that upon release it deploys into its crosswise relation to the central axial shaft 22. That way, the leading cross-bar end 26 is deployed to prevent being pulled through the aperture 16 for it in the tag 12b.

In use, it is preferred if two such filament fasteners 20 are used for each combination of trailing and leading (or outer and inner) tags 12a and 12b, although this is not shown. This distributes the strength among two filaments 22 and/or provides insurance if one fastener 20 is weak or otherwise breaks, the second holds fast. It is also preferred to use combinations of inner and outer tags 12b and 12a although the opportunity is afforded to economize and use just one.

FIG. 1 shows a preferred manner and placement of the avian medicament or pest control product 10 in accordance with the invention. The rooster thereof has been provided with left and right sets of avian medicament or pest control products 10 through his wing web as shown. That is, his outspread right wing shows an inner tag 12b hanging in his "armpit." His flapped down left wing shows an opposed outer tag 12a situated oppositely on the wing's outside. Although obscured from view in FIG. 2, the opposed combinations of inner and outer tags 12b and 12a are in each combination fastened by one, two or more PIN-ON® style filament fastener(s) 20 like shown by FIG. 2. Given the foregoing, the opposed combinations of tags 12a and 12b are thereby durably affixed. For example, with egg-laying operations, hens have a service life of between about twelve and fourteen months or so. Trials have shown that the tags 12 readily survive being worn by the wearers thereof for that length of time and cause no more than minimal stress or other ill effects on the health or productivity of the bird. The tags 12 can be replaced at intervals during that time if desired by simply snipping off and discarding the old tags 12 and fastener(s) 20 in favor of replacement with new ones. But presumptively the motivation behind that would be for reasons such as depletion of the efficacy of the old tags 12 and renewal by replacement with new ones. Again, trials have shown that the tags 12 attached as described survive for indefinite periods of time. The tags 12 are seemingly resistant to being pecked or scraped off by the wearers thereof and seemingly do not measurably ail the wearers either.

It is an aspect of the invention that the tags 12 are impregnated with chemicals or compounds such as medicaments or pest control agents. To accomplish this, suitable materials for the tag(s) 12 for such purpose include without limitation polyvinyl chloride plastic among others. Polyvinyl chloride plastic lends itself suitably for the purpose of being produced to carry a dose of a release agent such as insecticides, acaricides and/or miticides and the like which are allowed to "release" or otherwise exude or flow out slowly over time. It is believed without knowing for certain that some plastics have porosity characteristics which allow this use of them for releasing chemicals or compounds slowly over time. Regardless, such suitable plastic and/or resinous materials with these kinds of useful physical properties are known and utilized by producers of cat and dog flea collars or cow ear tags and the like.

Through trials the following findings have been made in particular in connection with managing northern fowl mites issues. Briefly, northern fowl mites are a wide spread blood-feeding ecto-parasite of poultry and is currently considered the external parasite of greatest importance in the U.S. to caged laying hens, layer breeders, and broiler breeders in the United States. Although while infestations of mites are known to cause poor fertility and anemia even death in roosters, the reported egg-production decreases in hens varies from 10–20%. An infestation of mites will also affect hatchability, undue weight loss, and poor feed conversion. The cost of a mite eradication or control program is usually justified by considering possible incremental production losses for large-scale caged-layer flocks, layer breeding flocks, or broiler breeding flocks. In addition, workers are often reluctant to perform their duties inside infested facilities because of the bites and allergy-like symptoms they may suffer.

Preferred control agents for northern fowl mites include to date without limitation such insecticides or acaricides as carbamates, organophosphates and synthetic pyrethroids that are commonly applied as dusts or sprays directly to the bird's immediate surroundings. A more preferential control agent includes without limitation PERMETHRIN or for example, in more difficult terminology, permethrin 3-(phenoxphenyl) methyl (±)-cis/trans-3-(2, 2-dichlorothenyl)-2, 2-dimethylcyclopropanecarboxylate. The PERMETHRIN might be associated or compounded with other substances including without limitation Piperonyl Butoxide.

The prior art way of broad application of such insecticides or acaricides to egg-laying hens finds among other problems that the hens laying fewer eggs. Egg production losses resulting from spraying or dusting operations may not be regained easily. The trend toward minimal insecticide or acaricide application to livestock has been facilitated by the use of formulations in plastic. Plastic permits long-term, slow-release of control agents and has been commercially accepted in the form of insecticide ear tags for cattle not to mention cat and dog flea collars. Insecticide incorporated into polyvinyl chloride plastic has been effective in controlling northern fowl mite populations on caged hens when applied as strips suspended from the cage tops, as bands applied to the legs of hens, or as bands strapped to the cage floor.

Figure 4:
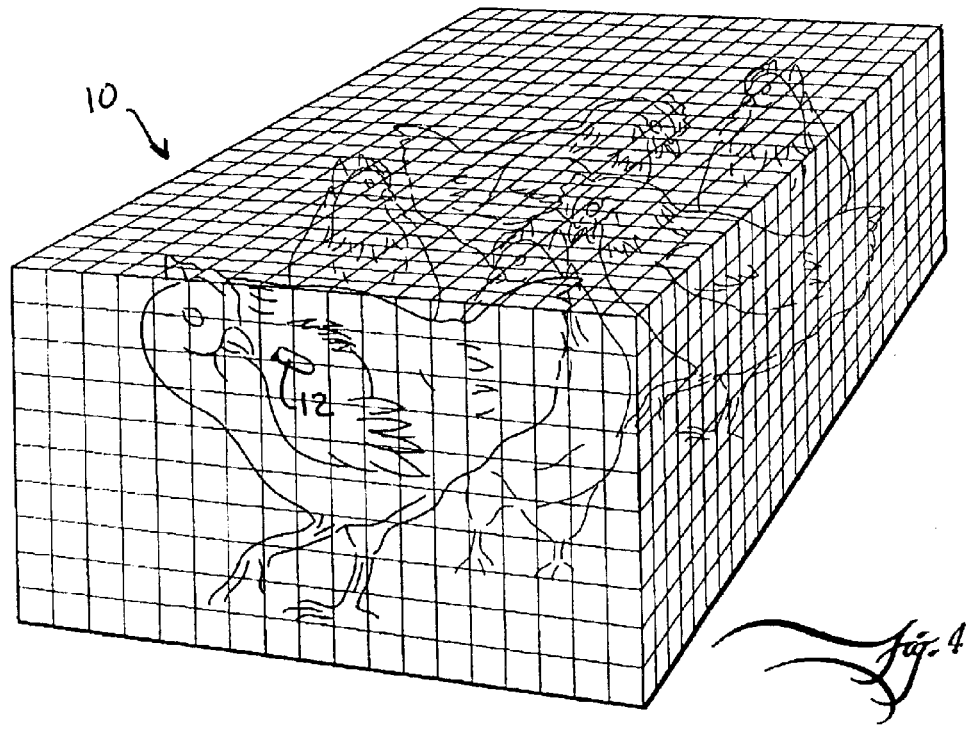
FIG. 4 is a perspective view of an avian medicament or pest control method in accordance with the invention wherein a group of livestock birds are illustrated in which only one selected individual is shown carrying the inventive avian medicament or pest control product(s) such that the pest control or medicament releasing action thereof is(are) spread among the non-carrying individuals by the carrying individual.

FIG. 4 shows various advantages provided by the avian medicament or pest control product 10 and method in accordance with the invention. In FIG. 4, just one bird is tagged with carrying the plastic device(s) 12. That is, with caged laying hens, only one hen per cage needs to be tagged with miticide tags 12. Her natural movements will facilitate the spread across her body of the miticide through the oil and wax of her feathers. During casual contact with other hens given the close quarters of the cage, the miticide is transferred from bird to bird within the same cage. Use of this device in caged layers will provide fast, safe, and economical control of northern fowl mites.

This method of treatment has applicability to both caged-layer and penned layer, broiler or breeder industries. Whereas FIG. 4 only shows the method in practice in a cage, in a pen (not shown) the miticide tags 12 need only be attached to a fraction of the flock, not every individual. The individuals which are carrying tags 12 will spread the miticide among the non-carrying individuals by the rubbing contact therebetween especially if given suitably high density confinement.

Breeding operations afford even better opportunities to ensure rubbing contact between individuals. That is, an entire breeder bird flock can be treated by attaching miticide tags 12 to the wing webs (two each side per bird) of each male bird (rooster). The control agent slowly releases from the tags 12 and moves through the natural oils present in the feathers of the rooster. As the rooster breeds or has casual contact with hens, the miticide is transferred to the hens' feathers and subsequently treats the hens. The way in which roosters breed hens helps this result. A rooster typically envelopes a hen with his wings during breeding activity. As far as activity goes, roosters are very active, seemingly perpetually active. A large-scale breeding operation might have a penned flock of twenty-thousand or so birds, comprising a mix of one rooster for every ten or twelve hens. Trials have found that complete control of northern fowl mite issues can be achieved over the entire flock by application of tags 12 only to the roosters. By using the miticide tags 12 attached to the wing webs of the rooster, this delivery system causes no disruption to the hen's laying activities, nor does it allow for contamination of air, water, feed, nesting boxes or eggs.

Accordingly, the inventive product and method affords opportunity to fill a huge void that currently exists in managing northern fowl mites on poultry.

FIG. 3 provides illustration of another version of the inventive product 10'. In contrast to FIG. 2, which shows separate tags 12a, 12b and filament fastener 20, FIG. 3 shows the filament fastener 20' modified such that the trailing end 1224 is enlarged and hence forms the device or "tag" (effectively 12a, or 12b) in which is incorporated the medicament or control agent. That is, this trailing end 1224 is a single unit piece in combination with the elongated central shaft or filament 22'. The leading cross-bar end 26 in FIG. 3 is comparably the same as in FIG. 2 and allows flexion for piercing targets (not shown in FIG. 3) and threading on the leading tag 12b as shown. This embodiment 20' of the inventive fastener can be reckoned as having a head end (eg., 1224) opposite a spike or driving end (eg., 26).

It is a preferred aspect of the invention to incorporate cross-bar style filament fasteners as shown by FIG. 2 or 3 and the like as these kinds of fasteners accommodate applicator tools (none shown) which permit fast work when time comes to tag the birds. However, affixing the medicament and/or pest control plastic devices or tags 12 to the birds can be accomplished by other suitable fastener configurations and so the invention is not intended to be limited to the particular fastener configurations or tag combinations specifically mentioned or shown.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A method of avian treatment or pest control comprising the steps of:

selecting a medicament or pest control release agent;

providing impregnable devices with impregnation of the selected medicament or pest control release agent for thereafter exuding or flowing out slowly over time;

providing a plurality of avian specimens for collective medicament or pest control treatments and selecting at least one but not all as carrier specimen(s), the remainder being reckoned as non-carrier specimens;

fastening one and another impregnable devices to each carrier specimen by a fastener piercing through some chosen anatomy thereof, said fastener fastening one impregnable device aside an entry wound and another impregnable device aside the exit wound, wherein said fasteners and impregnable devices are sized small to minimize stress or other ill effects on the health or productivity of carrier specimens, each of whose natural movements over time are consequently anticipated upon to disperse the release agent across his or her body through the oil and wax of his or her feathers; and promoting interactions between said carrier and non-carrier specimens such that rubbing contact therebetween transfers release agent onto the non-carrier specimens;

wherein interactions between carrier and non-carrier specimens are promoted by combining high-density rearing in pens or barns with established provisions around which there will be much crowding and jostling as common feeding or watering provisions.

2. A method of avian treatment or pest control comprising the steps of:

selecting a medicament or pest control release agent;

providing impregnable devices with impregnation of the selected medicament or pest control release agent for thereafter exuding or flowing out slowly over time;

providing a plurality of avian specimens for collective medicament or pest control treatments and selecting at least one but not all as carrier specimen(s), the remainder being reckoned as non-carrier specimens;

fastening one and another impregnable devices to each carrier specimen by a fastener piercing through some chosen anatomy thereof, said fastener fastening one impregnable device aside an entry wound and another impregnable device aside the exit wound, wherein said fasteners and impregnable devices are sized small to minimize stress or other ill effects on the health or productivity of carrier specimens, each of whose natural movements over time are consequently anticipated upon to disperse the release agent across his or her body through the oil and wax of his or her feathers; and promoting interactions between said carrier and non-carrier specimens such that rubbing contact therebetween transfers release agent onto the non-carrier specimens;

wherein the plurality of avian specimens essentially consists of breeding males and breeding females, and wherein the interactions between carrier and non-carrier specimens are promoted by virtue of choosing the males only for the duty of carrying the impregnable devices, whereby natural breeding attention given to the females will achieve transfer of the release agent thereto.

3. A method of avian treatment or pest control comprising the steps of:

selecting a medicament or pest control release agent;

providing impregnable devices with impregnation of the selected medicament or pest control release agent for thereafter exuding or flowing out slowly over time;

providing a plurality of avian specimens for collective medicament or pest control treatments and selecting at least one but not all as carrier specimen(s), the remainder being reckoned as non-carrier specimens;

fastening one and another impregnable devices to each carrier specimen by a fastener piercing through chosen some anatomy thereof, said fastener fastening one impregnable device aside an entry wound and another impregnable device aside the exit wound, wherein said fasteners and impregnable devices are sized small to minimize stress or other ill effects on the health or productivity of carrier specimens, each of whose natural movements over time are consequently anticipated upon to disperse the release agent across his or her body through the oil and wax of his or her feathers; and promoting interactions between said carrier and non-carrier specimens such that rubbing contact therebetween transfers release agent onto the non-carrier specimens wherein the chosen anatomy is through the wing web for locating one impregnable device in what corresponds to the specimen's armpit and hence in path of anticipated self-grooming movements as well as for locating the other impregnable device on the outer wing, on what might be imaginatively conceived as the specimen's shoulder, and hence in better position to rub against others.

4. The method of claim 3 wherein said fasteners comprise filament-style, double restrictor-ended fasteners and wherein said impregnable devices comprise flat tokens formed with apertures sized to closely fit around the central filament of the fastener but otherwise obstruct the restrictor ends from pulling through.

* * * * *